May 19, 1931. G. TALLON 1,805,729
OIL PAN FOR INTERNAL COMBUSTION ENGINES
Filed July 13, 1929
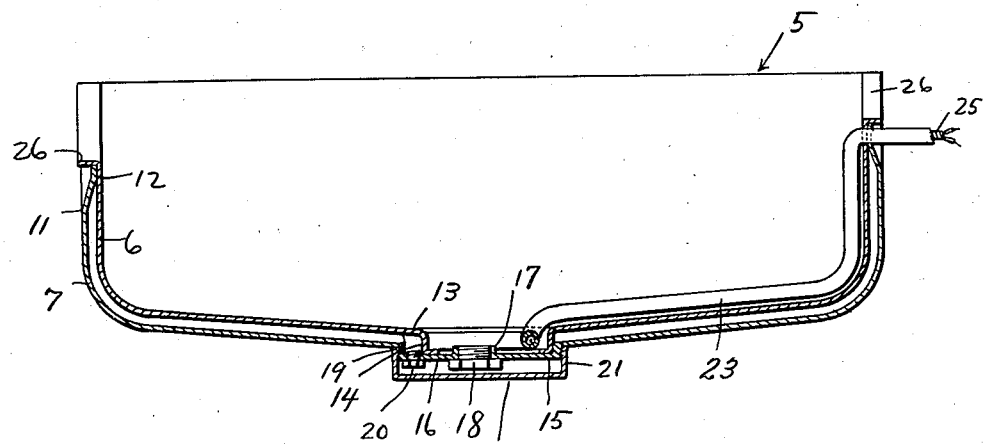
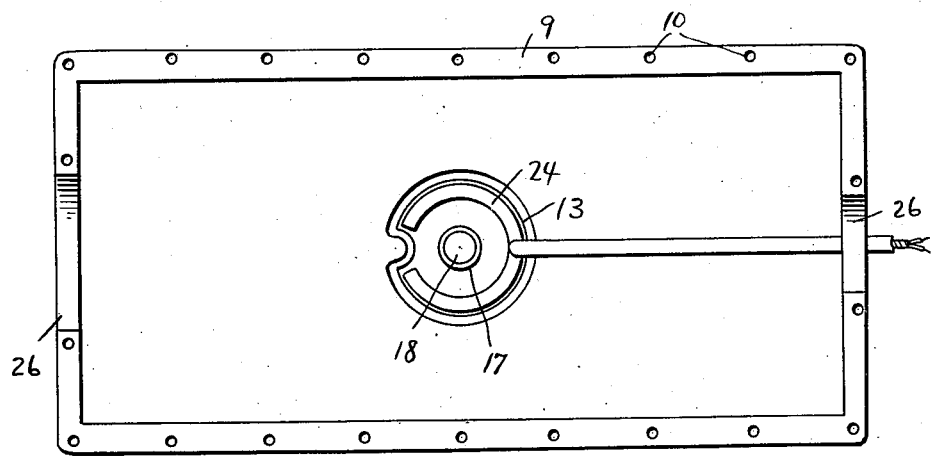
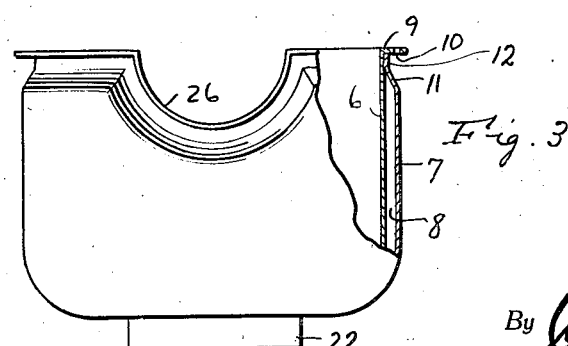
Inventor
George Tallon
By Clarence A. O'Brien
Attorney Patented May 19, 1931

1,805,729

UNITED STATES PATENT OFFICE

GEORGE TALLON, OF MALONE, NEW YORK

OIL PAN FOR INTERNAL COMBUSTION ENGINES

Application filed July 13, 1929. Serial No. 378,132.

This invention relates to oil pans for internal combustion engines and has as its primary object the provision of a pan of this character, which will prevent the escaping of the oil within the pan and thus permit of proper lubrication of the engine.

Another very important object of the invention is to provide an oil pan of the character above mentioned which is simple in construction, strong, durable, positive in operation, may be used in conjunction with any motor having an oil base without materially altering the construction of the motor, is economical, and may be manufacured and retailed at a nominal cost.

Other objects and advantages of this invention will become apparent during a study of the following description, taken in connection with the accompanying drawings, wherein:

Figure 1 is a longitudinal vertical sectional view, taken through my improved oil pan.

Figure 2 is a top plan view of the oil pan.

Figure 3 is an end elevation thereof, part of the pan being broken away.

In oil pans now used for this purpose, the walls of the pans are of single ply with the result that after the oil becomes warm, the cold air coming in contact with the walls of the pan causing the wall to "sweat," thus forming a vapor which runs into the oil, which, of course, as is well known, prevents the proper lubrication. It is to overcome this objectional feature that constitutes the primary object of this invention, and to that end I have constructed an oil pan embodying certain structural features, which will tend to obviate such objectionable features.

Referring, therefore, more in detail to the drawings, it will be seen that my improved oil pan is designated generally therein by the reference character 5 and that the same is of substantially elongated rectangular configuration, and is open at its top as is conventional. The side, bottom and ends of the pan are formed of an inner wall 6 and an outer wall 7, spaced from said inner wall to provide for the pan an air compartment or chamber 8. The inner wall 6 at the sides and ends thereof is provided with an outstanding flange 9. The flange 9 of the inner wall is provided with a plurality of spaced openings 10, to facilitate attachment of the pan in the usual well-known manner.

The outer wall 7 of the pan adjacent its top portion extends inwardly as at 11, and has its marginal edge secured to the top edge of the inner wall 6, directly beneath the flange 10 of said wall as at 12. By securing the walls at their top edges in this manner, a substantially air-tight compartment 8 is formed between the walls. In the bottom of the pan, the inner wall 6 and substantially centrally of said bottom is provided with a drain opening 13, and a flange 14 extends downwardly from said inner wall about said opening. That portion of the outer wall 7 of the pan, adjacent the opening 13 is depressed as at 15, to provide a bottom wall 16 for the drain outlet 13, the flange 14 having the lower end thereof resting within the depression 15 and constituting as it were a peripheral wall for said drain outlet 13. The bottom wall 16 of the drain 13 is provided with an outlet opening 17 and a plug 18 may be screw threaded or otherwise inserted within said opening 17, for closing the same. It is also to be noted that the bottom wall 16 of the drain 13 extends beyond the flange 14, the diameter of the depression 15 being greater than the diameter of the drain 13. The extended portion of the wall 16 is provided with a drain outlet 19, which constitutes an outlet for the chamber 8, said air chamber drain outlet 19 being normally closed through the medium of a suitable plug 20.

The outer face of the peripheral wall of the depression 15, formed in said outer wall 7 is screw threaded as at 21, for threaded engagement with a safety cap 22. This safety cap will, of course, protect the plugs 18 and 20 and at the same time will prevent air from striking the bottom 16 of the drain 13. Extending through an opening formed adajcent the upper edge of the walls 6 and 7 at one end of the pan 5 is a sheath or casing 23. This casing 23 is of substantially elongated tubular configuration and extends inwardly of the pan along said one end of the pan at the bottom of the pan, the inner end of the casing terminating in a substantially C-shaped end portion 24, which end portion 24 is located or adapted for disposition within the drain 13, resting upon the bottom wall 16 of the drain. An electrical heating unit 25 extends through the sheathing or casing 23, for heating the oil within the pan 5. This heating unit may be of any conventional electric type and may be controlled from a switch (not shown), located upon the dash board of the vehicle, when the oil pan is used with such internal combustion engines as are employed as the locomotive power of an automobile.

It may be also well to mention that at its ends, the inner and outer walls of the pan are suitably depressed, as at 26, thus permitting a ready application or substitution of this pan for the conventional type of pan now in use.

Obviously, in forming the pan of inner and outer spaced walls 6 and 7, the cold air will not affect the heated oil within the pan, since obviously the cold air striking the outer wall 7 of the pan with the result that any vapor formed thereby will be caught in the space 8 between the inner and outer walls, thus preventing any accumulation of vapor on the inner wall and will not, in any way, affect the oil within the pan.

Obviously, by removing the safety cap 22, the drain plug 20 may be removed so as to permit the drainage of vapor or any moisture which has accumulated within the air space 8 and likewise will also permit of the removal of the plug 18, for draining the oil from the pan.

Of course, the oil within the pan will be heated, through the medium of the electrical heating unit 25 and this unit will, of course, be suitably protected from contact with the oil, through the medium of its casing or sheathing 23.

From the foregoing then, it will be seen that I have provided an oil pan which will prevent the accumulation of vapor on the inner face of the wall of the pan, with the result that the heated oil will be always maintained in a pure state free from such vapor which would otherwise result in improper lubrication of the motor.

Even though I have herein shown and described the preferred embodiment of my invention, it is to be understood that the same is susceptible to changes fully comprehended by the spirit of the invention and the scope of the appended claims.

What is claimed is:

1. An open top oil pan for internal combustion engines, said pan comprising inner and outer spaced walls merging into one another along the upper side and end edges of the pan, to form an air space therebetween, said inner wall having a flange formed thereon, said flange provided with openings to facilitate the attachment of said pan to the crank case of the internal combustion engine, said pan being provided with a drain opening in the bottom thereof, a plug for closing said opening, the outer wall of said pan forming the bottom of said drain, said outer wall being further provided with an opening constituting the drain for said air space, a plug for closing said last mentioned opening, a safety cap secured to said outer wall for enclosing said plug, and means for heating the interior of said pan.

2. An open top oil pan for internal combustion engines, said pan comprising inner and outer spaced walls merging into one another along the upper side and end edges of the pan, to form an air space therebetween, said inner wall having a flange formed thereon, said flange provided with openings to facilitate the attachment of said pan to the crank case of the internal combustion engine, said pan being provided with a drain opening in the bottom thereof, a plug for closing said opening, the outer wall of said pan forming the bottom of said drain, said outer wall being further provided with an opening constituting the drain for said air space, a plug for closing said last mentioned opening, a safety cap secured to said outer wall for enclosing said plug, and means for heating the interior of said pan, said means including a sheathing extending into the pan along one end of said pan, and an electrical heating unit arranged within said sheathing.

3. An oil pan for internal combustion engines comprising inner and outer spaced walls to provide an air space extending along the sides and ends of the pan, said outer wall being provided with a drain opening in the bottom thereof for the interior of the pan, a plug for closing said opening, and said bottom wall being provided with a drain opening for the air space between said inner and outer walls, and a plug for closing said last mentioned opening.

4. An oil pan for internal combustion engines comprising inner and outer spaced walls to provide an air space extending along the sides and ends of the pan, said outer wall being provided with a drain opening in the bottom thereof for the interior of the pan, a plug for closing said opening, and said bottom wall being provided with a drain opening for the air space between said inner and outer walls, and a plug for closing said last mentioned opening, and a cup-shaped cap secured to said bottom wall and enclosing said plugs.

In testimony whereof I affix my signature.

GEORGE TALLON.